Figure 1:
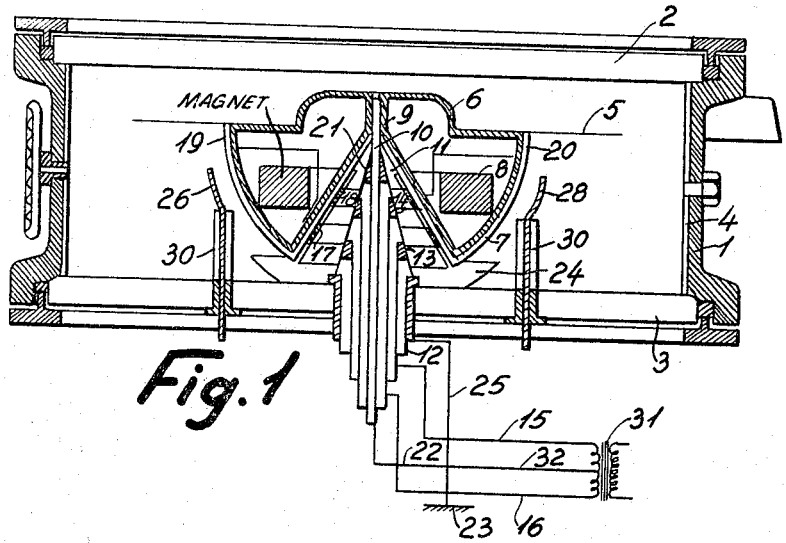

July 11, 1967

M. I. BECH 3,330,242

AUTOMATIC STEERING EQUIPMENTS FOR VESSELS

Filed May 19, 1964

2 Sheets-Sheet 1

INVENTOR.
Mogens I. Bech
BY
Watson, Cole, Grindle & Watson
ATTORNEYS

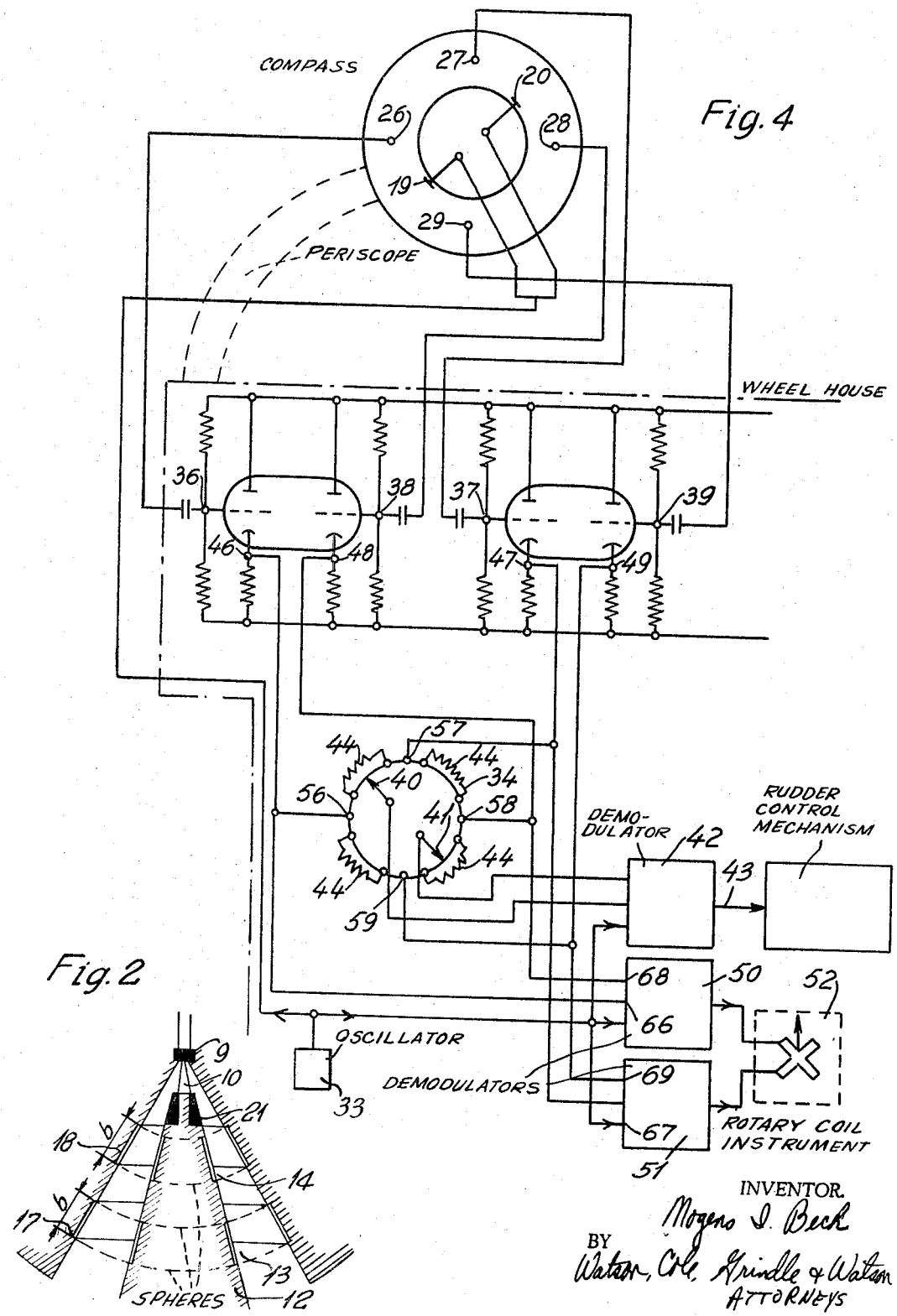

United States Patent Office 3,330,242
Patented July 11, 1967

3,330,242
AUTOMATIC STEERING EQUIPMENTS FOR VESSELS
Mogens Ilsted Bech, Birkerod, Denmark, assignor to Dansk Automatisk Ror-Kontrol A/S, Copenhagen, Denmark
Filed May 19, 1964, Ser. No. 368,605
Claims priority, application Denmark, May 25, 1963, 2,485/63, 2,486/63, 2,487/63
4 Claims. (Cl. 114—144)

This invention relates to automatic steering equipments for vessels or aircraft, comprising a compass with means for producing a course reference signal, and rudder control means actuated by the said course reference signal.

The known steering equipments of this kind suffer from the drawback that setting of the course must be performed by angularly setting the stationary parts of the compass relative to the vessel or craft or by employing a repeater compass. In the former case, it is necessary to arrange the compass in the wheel house of the vessel, which is often undesirable, partly on account of narrow space conditions in the wheel house, e.g. in fishing boats, and partly on account of poor magnetic conditions in the wheel house where many iron parts are frequently present. In the latter case it is necessary to employ a repeater compass which follows the rotary movement of the main compass without faults of angle. This cannot be obtained by employing a repeater compass which is controlled directly by an electrical course reference signal from the main compass, because a fault of angle will inevitably occur in such a compass owing to friction and other resistances, and even if these faults of angle may be negligible as far as reading of the course is concerned, they will still be too great to be acceptable in an automatic steering equipment. Consequently, in order to obtain a repeater compass following the main compass with sufficient accuracy, it is necessary to use a gyroscopic compass or a remote display compass with an electro-mechanical servo system. Both these arrangements are so expensive that the expenses will be prohibitive in many cases.

It is an object of the invention to construct an automatic steering equipment of the kind referred to in which the necessity of setting the compass to set the course is avoided by simple means so that a magnetic compass may be used, if desired, without having to resort to expensive electro-mechanical servo systems.

It is another object of the invention to devise a steering equipment of the kind referred to in which purely electrical means are used for obtaining a fully representative reproduction of the showing of the compass to permit setting of the course at a location remote from the compass.

With these and other objects in view, according to one main aspect of the invention, an automatic steering equipment for vessels comprises a compass, means associated with said compass for producing a course reference signal, an impedance network so geometrically arranged and so connected to said signal producing means as geometrically to depict the showing of said compass in the form of potential variations distributed in space, potential take-off means being associated with said impedance network and being adjustable relative thereto, said take-off means being connected to an input of rudder control means of said steering equipment.

Since an electrical reproduction of the showing of the compass is obtained in this novel automatic steering equipment by purely electrical means and without the employment of any mechanically movable parts, which reproduction may then be used instead of the main compass for the setting of the course, no faults of angle may occur owing to frictional forces and other mechanical forces and it therefore becomes possible, without resorting to expensive compasses or servo systems, to perform the setting of the course at another location than that at which the magnetic compass is arranged. The magnetic compass may consequently be arranged at any place outside the wheel house, possibly in such a manner that it can be read periscopically from the wheel house, as is well known per se with magnetic compasses not intended for automatic steering. In this case the steering equipment may be arranged entirely without a repeater compass. If it is not possible to arrange the magnetic compass in such a manner that it can be read from the wheel house, a simple repeater compass may be arranged in the wheel house, which repeater compass is controlled by the same signal from the main compass as that controlling the electrical reproduction of the showing of the compass in the impedance network.

The impedance network may on principle be constituted by a liquid in which feeding electrodes are arranged to which the course reference signal is applied, while the take-off members may be constructed with testing electrodes likewise in contact with the liquid. In this manner, the impedance network may be both electrically and mechanically equivalent to the main compass of the conventional system where the course reference signal is taken off from an electrical field produced in the compass liquid of the main compass.

However, a considerably simpler construction of the impedance network may be obtained according to the invention by constructing this in the form of a circular potentiometer resistor, at least three points of which are connected to testing means of said compass in mutual angular positions corresponding to those of said points.

The invention also relates to special forms of magnetic compasses which are particularly suitable for use in steering equipments constructed as above defined, though they may also find other applications.

Magnetic compasses for producing a course reference signal are known which comprise a stationary part, a part rotatable in a compass liquid in said stationary part, feeding electrodes attached to one of said parts for producing an electric field in the compass liquid, and testing electrodes attached to the other one of said parts for testing said electric field so as to produce the course reference signal.

The said course reference signal may be used either for remote showing of the course or for actuating the rudder control means of an automatic steering equipment for vessels or aircraft.

The known magnetic compasses of the kind referred to suffer from the limitation that they are only capable of delivering an acceptable course reference signal within a relatively limited angular range. To obtain satisfactory results, these known compasses must therefore be combined with a servo-motor tending to restore the compass to a neutral position under the influence of signals delivered by the compass when departing from the said neutral position in one direction or the other, the movement produced by the servo-motor being used for the transmission of the showing of the compass.

It is a further object of the invention to devise a magnetic compass of the kind referred to which does not suffer from the said limitation and by means of which a purely electrical and unambiguous transmission of an angle reference signal representative of the showing of the compass can be obtained within the full range of 360°.

According to a second main aspect of the invention, in a magnetic compass of the kind referred to, said feeding electrodes are arranged in such a manner as to produce a field varying in the circumferential direction in a representative manner, and the testing electrodes form a system of at least three electrodes located in such angular positions relative to one another that in any two different angular positions of the electric field relative to the testing electrode system there will always occur different potential combinations at the testing electrodes.

By the said testing in at least three points of a field varying in the circumferential direction in a representative manner it becomes possible to obtain an unambiguous functional relationship through all 360° of the showing of the compass between this showing and the potential combination detected by the testing electrodes.

On principle, it is immaterial whether the testing electrodes are attached to the stationary or to the rotatable part of the compass, but in practice, the first mentioned arrangement is preferable because the problem of establishing the necessary connections to the external circuits is thereby simplified seeing that as a rule two feeding electrodes will suffice so that only two electrically conducting paths are to be established from the stationary part to the rotatable part.

A further problem encountered in magnetic compasses for producing an electrical course reference signal is exactly that of providing such electrical connections to and from electrodes carried by the rotatable part of the compass to the stationary surroundings without impeding the free rotatability of the rotatable part, which is very important, because the rotatable part must be capable of setting itself in an accurate angular position under the influence of the weak forces of the magnetic field of the earth. In the following discussion, the said electrodes which are carried by the rotatable part and are in electrically conductive connection with the compass liquid will be referred to as "terminal electrodes" in order to distinguish them from other electrodes of the compass and, as will be understood, they may serve either to produce an electrical field in the compass liquid, or to detect such a field.

It is a still further object of the invention to obtain a transfer of voltages to or from the terminal electrodes of the rotatable part of the compass entirely without the use of supply conductors forming an obstacle to the free rotatability of said rotatable part, and at the same time in such a manner that the transfer of voltages is substantially independent of rolling movements of the compass.

With this and other objects in view, according to a third main aspect of the invention, a magnetic compass for producing a course reference signal comprises a stationary part, a part rotatable in a compass liquid in said stationary part, said rotatable part having a bearing at the top of a downwardly open conical cavity thereof, said stationary part having an upwardly extending conical supporting member carrying a pivot at the top thereof, said bearing being supported on said pivot, said rotatable part carrying terminal electrodes in electrical contact with said compass liquid, pairs of annular electrodes being mounted in mutually facing relationship on the conical inner wall of said cavity and on the conical outer wall of said supporting member respectively, each pair being delimited by the lines of intersection of two geometrical spheres having their common center in the pivoting center of said rotatable part with said conical walls, the annular electrodes carried by said rotatable part being electrically connected with said terminal electrodes the annular electrodes carried by said supporting member being connected with external circuit conductors.

Moreover, according to the invention, the construction may preferably be such that the various annular electrodes carried by each one of said parts have the geometrical shape of truncated cones having the same height. In this manner, the conductance of the electrical paths through the compass liquid between the various pairs of annular electrodes will be the same, so that these paths will be in balance.

According to a preferred embodiment of the invention, the upper portion of said conical supporting member comprises a grounded electrode, and the lower portion of said conical supporting member is surrounded by a radially extending grounded shield which electrically shields the space between said rotatable part and said supporting member from the space outside said rotatable part. In this manner the supply paths to the terminal electrodes of the rotatable part of the compass formed between the pairs of annular electrodes are prevented from interfering with the electrical field in the compass liquid outside the rotatable part.

Figure 3:
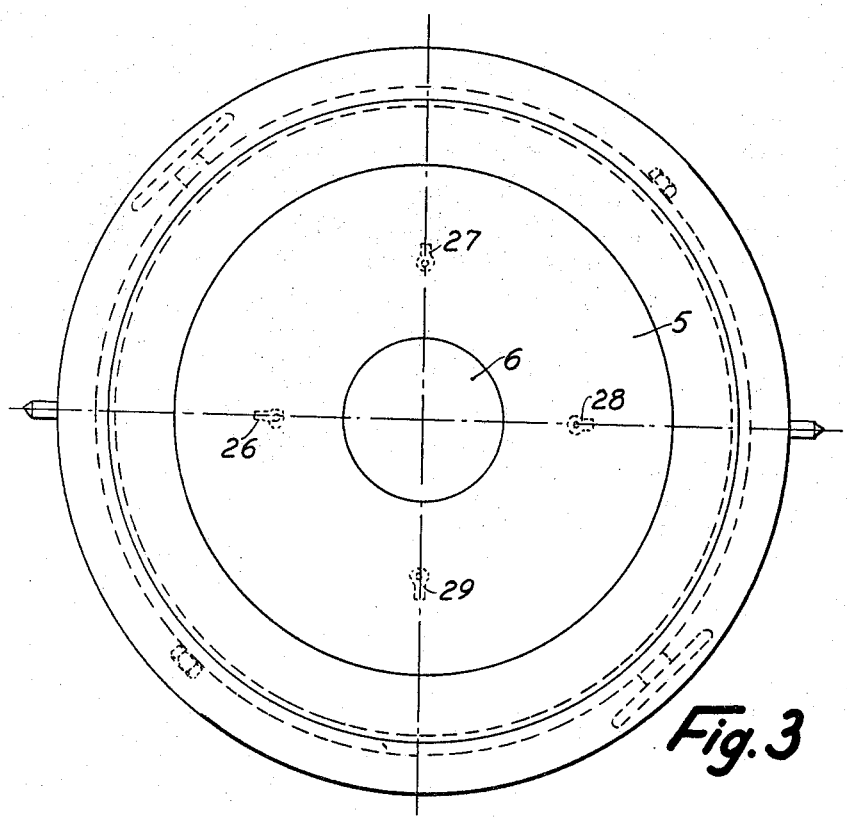

Further objects and advantages of the invention will be apparent to those skilled in the art from the following detailed description of one embodiment which is illustrated in the accompanying drawings in which FIG. 1 shows a vertical section through one form of a magnetic compass according to the invention, FIG. 2 a diagram illustrating the delimitations and size relationship of two sets of annular electrodes of the compass illustrated in FIG. 1, FIG. 3 a top view of the compass of FIGS. 1 and 2, and FIG. 4 a diagram of one form of an automatic steering equipment according to the invention and also illustrating means for using the course reference signal produced by the compass for the remote display of the course.

In the compass illustrated in FIGS. 1–3, 1 is the compass bowl which may preferably be constructed with a glass cover 2 and a glass bottom 3, so that the compass may be suspended in a compass housing provided with a reflection device which compass housing may, if desired, be arranged outside the wheel house of a vessel for periscopical reading.

On its inner face, the compass bowl is provided with an electric insulation 4, because the metal of the compass bowl is grounded.

5 is the compass card, and 6 a float carrying same. Below the compass card, this float is constructed as part of a sphere which on its outer face is provided with an electric insulation 7. Inside the float, a compass magnet 8 is arranged which is preferably in the form of an annular magnet. 9 and 10 are a jewel hole and a pivot of the type usually employed in magnetic compasses. The jewel hole 9 is located at the upper end of a downwardly open conical cavity 11 of the float, while the pivot 10 is carried at the upper end of a likewise conical supporting member 10 which extends upwards from the bottom of the compass bowl into the cavity 11 of the float. On the supporting member 12 of the pivot, annular electrodes 13 and 14 are arranged which are connected with external supply conductors 15 and 16. In positions opposite the annular electrodes 13 and 14, similar annular electrodes 17 and 18 are arranged on the inner wall of the cavity 11 of the float, said electrodes 17 and 18 being in galvanic connection with one and the other respectively of two feeding electrodes 19 and 20 arranged on the outer face of the float in diametrically opposite positions.

The delimitations and size relationships of the annular electrodes 13, 14 and 17, 18 are apparent from FIG. 2. By constructing the annular electrode sets as illustrated so as to be delimited by geometrical spheres having their center in the tip of the pivot, the advantage is obtained that the field strength and the field distribution in the compass liquid between these electrodes will be independent of relative movements of the vertical axis of the compass card and the vertical axis of the compass bowl.

As is also apparent from FIG. 2, the two annular electrodes on either of the two parts considered, i.e. the supporting member and the float have the geometrical shape of truncated cones having the same height. Thereby the conductance of the liquid path between the two annular electrodes of either pair will be the same.

The upper part of the conical supporting member 12 is constituted by an electrode 21 which is grounded at 23 through an external supply conductor 22. Moreover, the supporting member is surrounded at its bottom by a shield 24 which is also grounded at 23 through an external supply conductor 25 and which electrically shields the space between the supporting member and the float from the space outside the float. In this manner, the distribution of the A.C. electric field formed between the annular electrodes 13 and 14 is limited to the region between the two shielding electrodes 21 and 24.

Four stationary electrodes 26, 27, 28 and 29 are mounted in the compass bowl at angular spacings of 90°. These electrodes serve as testing or detecting electrodes and are located at a small spacing from the spherical face of the float. At their upper ends, they are shaped as circular arcs having their center at the tip of the pivot. The parts of the testing electrodes below the arcuate end portions are surrounded by an electrical insulation 30.

If an A.C. voltage is applied between the annular electrodes 13 and 14 through the conductors 15 and 16, e.g. by means of a transformer 31 with grounded center tapping 32, this A.C. voltage will without appreciable losses be transferred to the annular electrodes 17 and 18 and from these to the feeding electrodes 19 and 20. Since the latter are lying naked in the compass liquid, a potential field will be produced between these electrodes through the compass liquid. This field will subject each of the stationary testing electrodes 26, 27, 28 and 29 to a potential having an amplitude representative of the location of the testing electrode in question relative to the feeding electrodes 12 and 13. In two different mutual positions of the compass card and the compass bowl there may never occur the same combinations of potentials at the four testing electrodes 26, 27, 28 and 29. The potential combination detected by these four testing electrodes will therefore constitute a signal unambiguously representative of the position of the compass card relative to the compass bowl or in other words representative of the showing of the compass, throughout the full range of 360°.

If the compass card rotates at a constant speed, the testing electrodes will deliver an A.C. voltage consisting of an oscillation of the basic frequency modulated with a four phase sinus voltage in the example here considered.

The diagram in FIG. 4 shows two different ways in which a course reference signal consisting of the voltage combination at the four testing electrodes 26–29 may be utilized, viz. partly for the automatic steering of vessels or aircraft, partly for the remote display of the course.

In FIG. 4, the two feeding electrodes and the four testing electrodes are denoted by the same reference characters as in FIG. 1. The feeding electrodes 19 and 20 are coupled to an oscillator 33, supplying a balanced reference signal. The testing electrodes 26, 27, 28 and 29 are connected respectively to four inputs 36, 37, 38 and 39 of a cathode follower amplifier, the four outputs 46, 47, 48 and 49 of which are connected to four points 56, 57, 58 and 59 of a circular potentiometer resistor 34, said points being mutually spaced at 90°. The potentiometer resistor 34 is provided with a rotatable take-off member having two diametrically opposite take-off contacts 40 and 41 which are coupled to a demodulator 42, the output 43 of which is connected to the input of a rudder control mechanism of known kind, not shown, which as usual may comprise controls for sensitivity, counter rudder etc., as well as a servomotor for turning the rudder in accordance with the course reference signal received.

It will be seen that the potentiometer resistor 34 constitutes a geometrical electrical reproduction of the electric field in the compass, seeing that upon rotation of the compass card relative to the compass bowl, the potentials at the four points 56, 57, 58 and 59 will vary in the same manner as the potentials at the four testing electrodes 26, 27, 28 and 29. In order to compensate for non-linear field distribution between the testing electrodes, parts of the potentiometer resistor 34 may be shunted with compensation resistors 44. The desired course on which the vessel or craft is to be steered may therefore be set by setting the take-off member 40, 41 relative to the potentiometer resistor 34 in exactly the same manner as the desired course is set in previously known steering equipments with magnetic compass by setting of the compass bowl relative to the vessel or craft. The setting by means of a potentiometer has the advantage that it is no longer necessary to arrange the magnetic compass in the wheel house because no handling of the compass bowl is required to set the course. There is no danger of faults of angle resulting from this indirect steering, because the transfer of the showing of the compass from the latter to the potentiometer resistor takes place purely electrically, i.e. entirely without the use of mechanically movable parts.

In FIG. 4 it is also shown how the voltage combination tested by means of the testing electrodes 26, 27, 28 and 29 may be utilized for the remote display of the course. With this object in view, two of the outputs 46 and 48 of the cathode follower amplifier are connected to inputs 66 and 68 of a demodulator 50, while the remaining outputs 47 and 49 are connected to inputs 67 and 69 of a demodulator 51. The outputs of the two demodulators 50 and 51 are connected to a rotary coil instrument 52 which thereby receives a signal, which throughout all 360° of the showing of the compass is an unambiguous function of the voltage combination at the four testing electrodes 26, 27, 28 and 29 and consequently of the showing of the compass.

It will be understood that as far as the function and operation of the potentiometer arrangement is concerned, it is immaterial whether the voltage combination applied to the potentiometer resistor is derived from a magnetic compass of the kind described or is derived in any other suitable manner, e.g. by means of photo electric cells in combination with illuminated fields of suitable shape on the compass card.

Moreover, it is possible, within the scope of the invention, instead of the circular potentiometer resistor illustrated to employ any other form of impedance network which is capable of giving a geometrically distributed electrical reproduction of the showing of the compass. Instead of a combination of four voltages, the course reference signal may consist of a combination of three voltages or a combination of a number of voltages greater than four.

Moreover, it will be understood that as far as the function and operation of the illustrated magnetic compass is concerned, it is immaterial whether the utilization of the voltage combination at the four testing electrodes 26, 27, 28 and 29 takes place in either of the manners illustrated in FIG. 4 or in any other manner.

It is also observed that instead of four testing electrodes, it is possible to use three testing electrodes seeing that also in that case a voltage combination will occur at the testing electrodes which is an unambiguous function of the showing of the magnetic compass. If desired, more than four testing electrodes may be used. For practical reasons, the testing electrodes are preferably arranged at a uniform angular spacing, but this is not strictly necessary.

Instead of arranging the testing electrodes in the compass bowl and the feeding electrodes on the compass card, the opposite arrangement is also possible.

If desired, the number of feeding electrodes may be greater than two.

I claim:

1. A magnetic compass assembly for producing a course reference signal comprising a bowl containing a liquid, an upwardly extending conical supporting member mounted in said bowl to extend into the liquid, said supporting member carrying a pivot at the top thereof, a float buoyantly supported in said liquid within said bowl, magnetic compass means influenced by the earth magnetism carried by said float, said float being constructed with a downwardly open conical cavity, bearing means in the float at the top of said conical cavity, said float arranged to ride with said bearing means being supported on said pivot for three-dimensional pivotable movement of said float relative to said pivot position within said bowl, external electrodes affixed to said float in electrical contact with said liquid, pairs of conical annular electrodes with corresponding electrodes of each pair being mounted opposite one another respectively on the conical wall of said cavity and on the conical outer wall of said supporting member respectively, each pair being delimited by the lines of intersection between said conical walls and two geometrical spheres having their common center in the bearing of said float, means electrically connecting the annular electrodes carried by said float respectively with said external electrodes, and means connecting the annular electrodes carried by said supporting member to supply terminals exterior of said bowl.

2. A magnetic compass as in claim 1 in which the upper portion of said conical supporting member comprises a grounded electrode, and the lower portion of said conical supporting member is surrounded by a radially extending grounded shield.

3. An automatic steering equipment for vessels comprising a magnetic compass assembly comprising a bowl containing a liquid, an upwardly extending conical supporting member mounted in said bowl to extend into the liquid, said supporting member carrying a pivot at the top thereof, a float buoyantly supported in said liquid within said bowl, magnetic compass means influenced by the earth magnetism carried by said float, said float being constructed with a downwardly open conical cavity bearing means in the float at the top of said conical cavity, said bearing means being supported on said pivot for three dimensional pivotal movement of said float about said pivot, feeding electrodes carried on said float in electrical contact with said liquid, pairs of conical annular electrodes being mounted with electrodes of each pair respectively affixed opposite one another on the conical wall of said cavity and on the mating conical outer wall of said supporting member respectively, each pair being delimited by the lines of intersection between said conical walls and two geometrical spheres having their common center in the pivoting center of said float, means electrically connecting the annular electrodes carried by said float with said feeding electrodes, means electrically connecting the annular electrodes carried by said supporting member with supply terminals exterior to said bowl, whereby said feeding electrodes are arranged to produce an electric field in the liquid varying in the circumferential direction in a manner representative of float position on said pivot, a system of at least three testing electrodes mounted in the bowl and extending into the liquid for picking up potentials from said potential field, an electrical network having input terminals which represent fixed angular locations of the compass coupled to said testing electrodes and providing, in operation, potentials at these points representative of the angular displacement of said float, and adjustable means coupled to said network to receive a plurality of potentials therefrom and select portions thereof representative of a desired course for the vessel, and rudder control means coupled to the adjustable means responsive to the potential received from said network for steering the vessel on the desired course.

4. An automatic steering equipment as in claim 3, in which the magnetic compass assembly is arranged outside the wheel house of a vessel, optical means being provided for directly reading the compass from the interior of the wheel house, said electrical network being arranged in the wheel house.

References Cited
UNITED STATES PATENTS

| | | | |
|---|---|---|---|
| 1,991,129 | 2/1935 | Urfer | 340—177 |
| 2,003,929 | 6/1935 | Fischel | 340—177 |
| 2,066,114 | 12/1936 | Lee | 340—177 |
| 2,466,763 | 4/1949 | Davis | 340—345 |
| 2,593,973 | 4/1952 | Briggs | 340—345 |

MILTON BUCHLER, *Primary Examiner.*

THOMAS B. HABECKER, *Examiner.*